United States Patent [19]

Sloan et al.

[11] 4,222,111

[45] Sep. 9, 1980

[54] METHOD AND APPARATUS FOR MONITORING STATUS OF TABLES IN A RESTAURANT

[75] Inventors: John W. Sloan; Frank E. Bumb, Jr., both of Phoenix, Ariz.

[73] Assignee: Sherwood Johnston, Phoenix, Ariz.

[21] Appl. No.: 861,648

[22] Filed: Dec. 19, 1977

[51] Int. Cl.[2] .......... G06F 3/02

[52] U.S. Cl. .......... 364/900; 340/286 R

[58] Field of Search .......... 364/200, 900; 235/92 B, 235/92 AC, 92 CP, 92 CT, 92 DP, 92 R

[56] References Cited

U.S. PATENT DOCUMENTS 3,304,416 2/1967 Wolf .......... 235/92 R 3,310,797 3/1967 Auger .......... 340/286

*Primary Examiner*—Gareth D. Shaw

*Assistant Examiner*—David Y. Eng

*Attorney, Agent, or Firm*—Cahill, Sutton & Thomas

[57] ABSTRACT

System and method for monitoring occupancy and status of restaurant tables to minimize the time each table is unoccupied. The system includes a processor unit coupled by means of serial data buses to a host unit and a plurality of service units. The host unit includes separate push buttons, or "table buttons", which correspond, respectively, to tables within a particular service area of the restaurant. The processor unit computes and stores the status of each table in the restaurant. The processor periodically computes and transmits display information representative of the updated status of the tables to the host unit and the service units. Such display information for a particular table is utilized at both the host station and the appropriate service station to illuminate or flash the table buttons in such a manner as to indicate the present status of the corresponding tables to restaurant personnel. The table status for a particular table is updated by depressing the corresponding table button of either the host station or a service station. The table button thereby closes a switch, which causes switch closure information to be transmitted to the processor unit. The processor unit computes updated status information in response to the switch closure information received from the host unit or service unit and stores the updated table status in a memory of the processor unit. The updated status information is subsequently transmitted to the appropriate service unit and the host unit to illuminate or flash the appropriate table buttons in such a manner as to indicate the updated table status to restaurant personnel.

18 Claims, 12 Drawing Figures

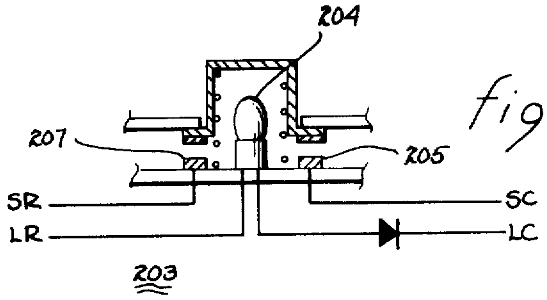
fig. 6a
fig. 6b
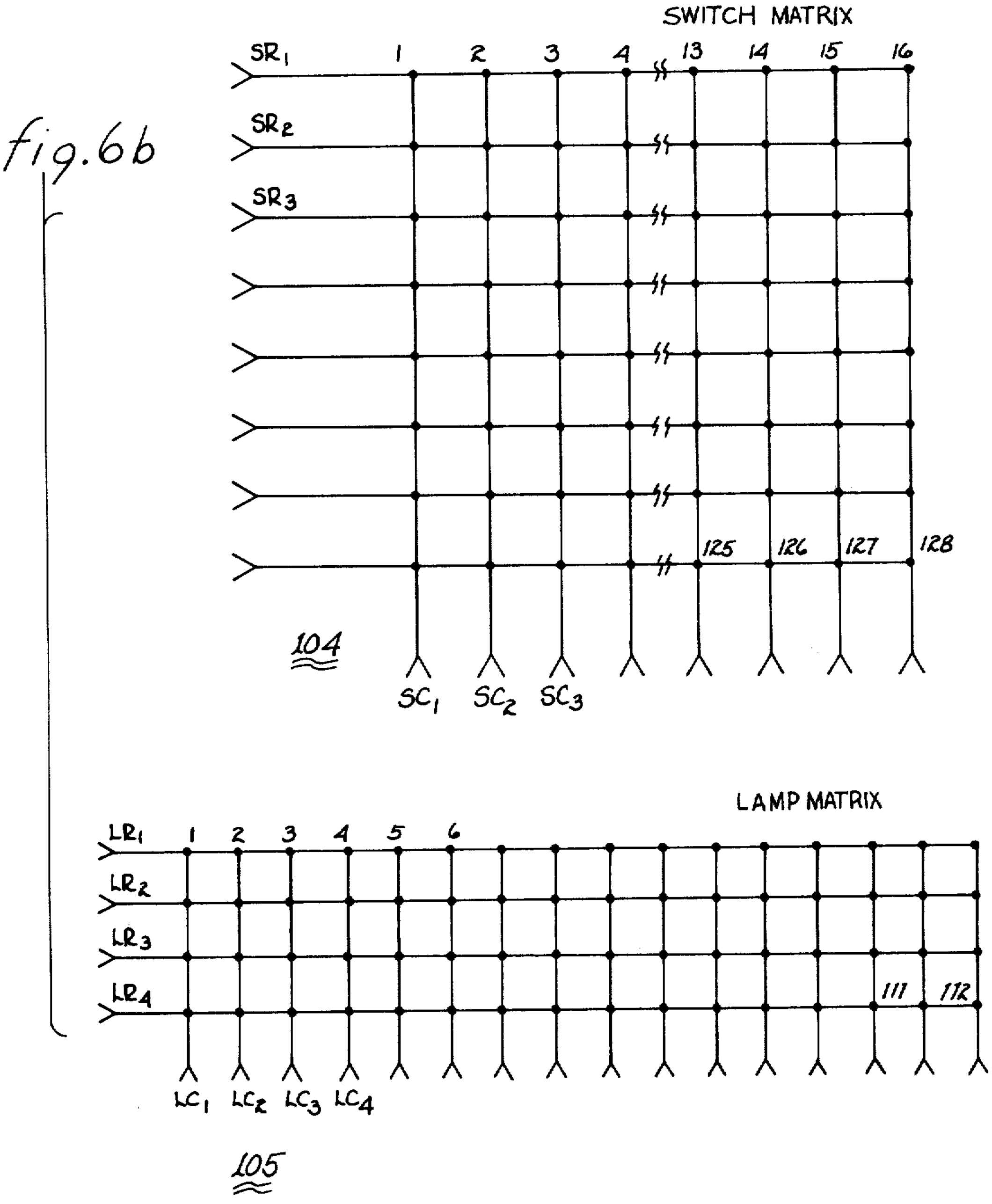

METHOD AND APPARATUS FOR MONITORING STATUS OF TABLES IN A RESTAURANT

BACKGROUND OF THE INVENTION

1. Field of the Invention

The invention relates particularly, but not exclusively, to methods and computing apparatus for monitoring status of tables in a restaurant to minimize the amount of time that tables are unoccupied, thereby maximizing the number of table turns for each table.

2. Descripion of the Prior Art

Many modern restaurants are designed to provide various unique and pleasant surroundings to enhance dining pleasure. Such restaurants are often large and have complex layouts of tables, booths, and varius decorative dividers and other decorative objects to enhance privacy for patrons of the restaurant. The discriminating restaurant diner expects excellent service as well as excellent food at such a dining establishment.

It is very important to the management of such restaurants to minimize the amount of time that each table is unoccupied, especially during certain busy periods, such as lunch periods, dinner periods and weekend evenings. However, in large restaurants which are designed to produce "atmosphere", as described above, there is a heavy burden on restaurant personnel, including the hostess, who controls the seating arrangements in the restaurant, the waitresses, and the busboys to monitor the status of all tables in the restaurant in order to make sure that no table remains unoccupied any longer than absolutely necessary for cleaning and resetting, hereinafter referred to as "bussing". The hostess must make lists of parties of various sizes waiting for tables. The hostess must also be able to inform a waiting customer how long he will have to wait for a suitable table. The busboys and waitresses must attempt to communicate the status of a table as customers leave, and as tables are bussed and reset to the hostess, who must somehow remember all of this infomation and quickly summon the next waiting party. Inefficiency in accomplishing these tasks results in longer waiting periods for customers, thereby frequently causing dissatisfaction of waiting customers. The number of table turns (the number of times a table is occupied by new parties) per dinner period or lunch period is also reduced. This usually has a serious negative impact on profitability of the restaurant.

One known system for monitoring status of restaurant tables utilized a separate flip-flop corresponding to each table to indicate whether the table was occupied. Indicator lights on a Master Unit indicated the state of each flip-flop. The flip-flops could be set or reset by the hostess by means of corresponding switches on a Master Unit. The flip-flops could be reset, but not set, by remote switches activated by busboys to indicate when the corresponding tables were bussed and reset.

The problem posed to restaurant managers of improving the efficiency of the procedures for rapidly cleaning and resetting tables, quickly seating waiting customers at tables of appropriate size, is a very difficult problem. One way of solving this problem involves hiring of experts to do time-motion studies. This approach is very costly, and involves voluminous records, and is very time consuming. Another way is to rely on information from restaurant pesonnel; however, such information is likely to be very imprecise. Accurate information regarding the occupancy of tables, and the amount of time that seating and cleaning operations take, etc., is generally difficult to obtain.

There is a need for systems and methods which improve the communication between restaurant personnel to minimize the time during which tables are unoccupied by customers, especially during rush hours. There is a need for improved methods and systems for monitoring the entire service operation and presenting data which is useful to restaurant managers so that the data may be analyzed and acted upon to eliminate specific problems to improve overall operating efficieny of the restaurant.

SUMMARY OF THE INVENTION

Accordingly, it is an object of the invention to provide a system and method for reducing the amount of time that restaurant tables are unoccupied.

It is another object of the invention to provide a system and method for reducing the amount of time that work stations in a service establishment are inactive.

It is another object of the invention to provide a method and apparatus for improving the efficiency of communication between restaurant personnel.

It is another object of the invention to provide a method and system for decreasing the waiting time of restaurant patrons.

It is another object of the invention to provide improved apparatus and method for producing data concerning the number of table turns of tables in a restaurant.

It is yet another object of the invention to provide apparatus which requires reduced amount of labor to install than previous systems for monitoring restaurant table status.

It is another object of the invention to reduce the number of connections between host units and service units required for systems for monitoring table status in a restaurant.

Briefly described, and in accordance with one embodiment thereof, the invention provides a method and apparatus including a processor unit coupled to a host unit and a service unit. The host unit and the service unit are capable of receiving manually entered information representative of certain events at a table from restaurant personnel. The host unit and the service unit are capable of transmitting such information to the processor unit, wherein the processor unit computes and stores updated table status information in a memory thereof. The processor unit subsequently computes and transmits display information representative of the updated table status to the host unit and/or the service unit, causing the host unit and/or the display unit to display the status of the table to restaurant personnel.

The processor unit includes an eight bit microprocessor and an electrically programmable read only memory for storing the operating program. The processor unit also includes a random access memory including a separate word location for storing the status of each table in the restaurant. The processor unit also includes a plurality of peripheral interface adaptor circuits bidirectionally interfacing between the microprocessor data bus and other circuitry in the system. Separate bi-directional serial data buses couple the processor unit to the host unit and each of the service units. An input/output circuit coupled to the interface adaptor peripheral data buses includes circuitry for receiving signals from and sending signals to the microprocessor data bus. Universal Asynchronous Receiver/Transmitter circuits (UARTs) are utilized to provide the parallel-to-serial conversion and the serial-to-parallel conversion necessary to interface between the processor and the bi-directional serial data buses connected to the host and service units.

The host and service units each include a plurality of push buttons, hereinafter table buttons. Each table button of the host unit represents a particular table in the restaurant. The layout of the table buttons on the host unit and the service units corresponds to the layout of tables in the restaurant. Each table button of each service unit also represents a particular table in the resturant. Thus, each table in the restaurant is represented by one table button of the host unit and one table button of one of the service units. Each table button produces a switch closure signal in a switch matrix of the corresponding host or service unit when that table button is depressed.

Conductors of the switch matrix in each host unit or service unit are periodically scanned by means of scanning circuitry, thereby causing switch closure information to be detected and transmitted to the processor unit. The processor unit then executes a routine which utilizes the switch closure information to compute updated table status information, which is stored in the memory. The processor unit also periodically computes display information from updated status information stored in the memory and transmits the display information to the host unit and the appropriate service unit. The display information is converted to a serial format for transmission on the appropriate serial data buses to the host unit and service unit. The serial display is converted by means of UARTs and associated circuitry in the host unit and the service unit to signals which are applied to the lamp matrixes in the host unit and service unit.

Each of the table buttons includes a lamp disposed within that table button to illuminate it under control of the processor unit to indicate the status of the corresponding table in response to the received display information. The lamps of each unit are connected to conductors of a lamp matrix of that unit. Signals representative of the display information are produced by circuitry driven by the UART and are applied to conductors of the lamp matrix. The table buttons are thereby illuminated to indicate occupancy, or are flashed at different rates to indicate that the table is being bused and reset or that it is ready for another customer.

In one embodiment of the invention the processor unit counts and stores the number of times each table is occupied (i.e., the number of table turns) during a predetermined period, such as a lunch period or a dinner period. The cumulative total number of table turns for each table for each such period are also computed and stored by the processor unit. The host unit further includes control switches for signaling the processor unit to access its memory and cause the various table turn counts to be displayed. In another embodiment of the invention, the average occupancy time for each table is stored and, upon command, the average remaining occupancy time is computed and displayed for a preselected table, so that the hostess may inform a waiting customer of the likely remaining waiting time for that table.

In another embodiment of the invention a single bidirectional data bus couples a main processor unit to the host unit and all of the service units. Each of the service units includes circuitry for identifying an address code associated with that host unit or service unit to enable that host unit or service unit to transmit status information to the single bi-directional data bus. Each host unit and each service unit include an on-board microprocessor and memory which perform the functions of formatting status information received from the main processor unit and producing display signals representative of the status information to drive the lamp matrix of that host unit or service unit. The on-board microprocessor and memory of each host unit or service unit also control the scanning of the switch matrix of that host unit or service unit to detect switch closures representative of new table status information. The new table status information is reformatted by the on-board microprocessor and memory and held ready for transmission to the processor unit in response to an appropriate address code transmitted by the processor unit.

Figure 1:
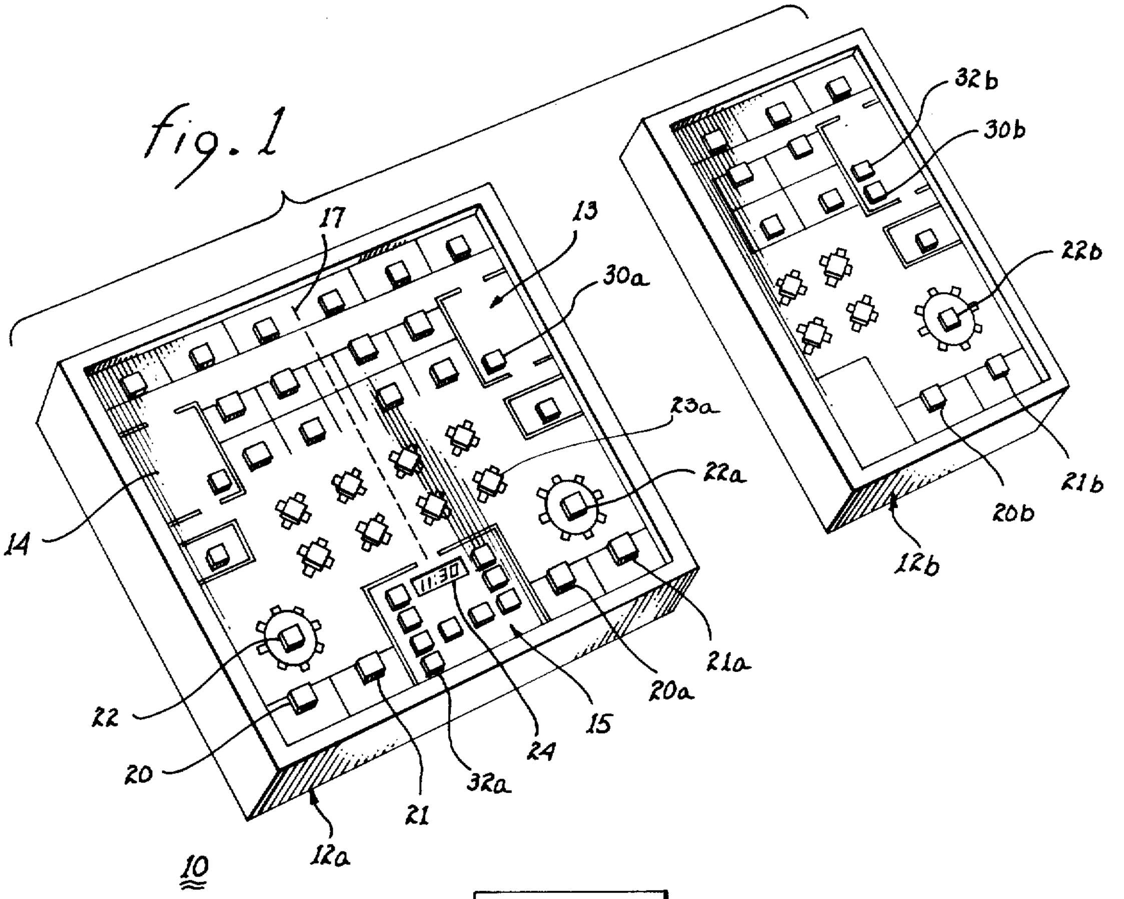
FIG. 1 is a perspective drawing of a host unit console and a service unit console of a system for monitoring the status of tables in a restaurant.

FIG. *6a* is a diagram showing a sectional view of a table button of the console of FIG. 1.

Figure 3:
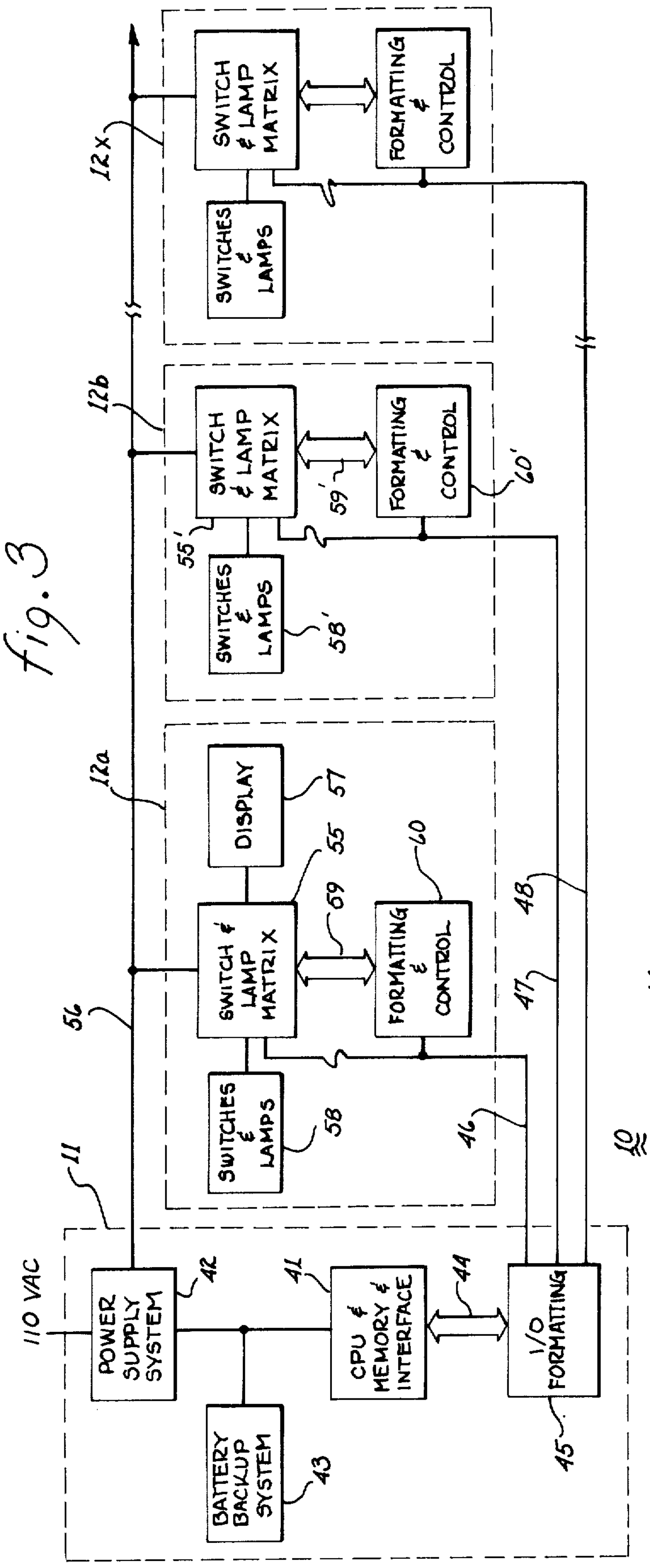
FIG. 3 shows a block diagram of the table monitoring system of the invention.

FIG. *6b* is a diagram showing the switch matrix and lamp matrix of the diagram of FIG. 3.

Figure 7:
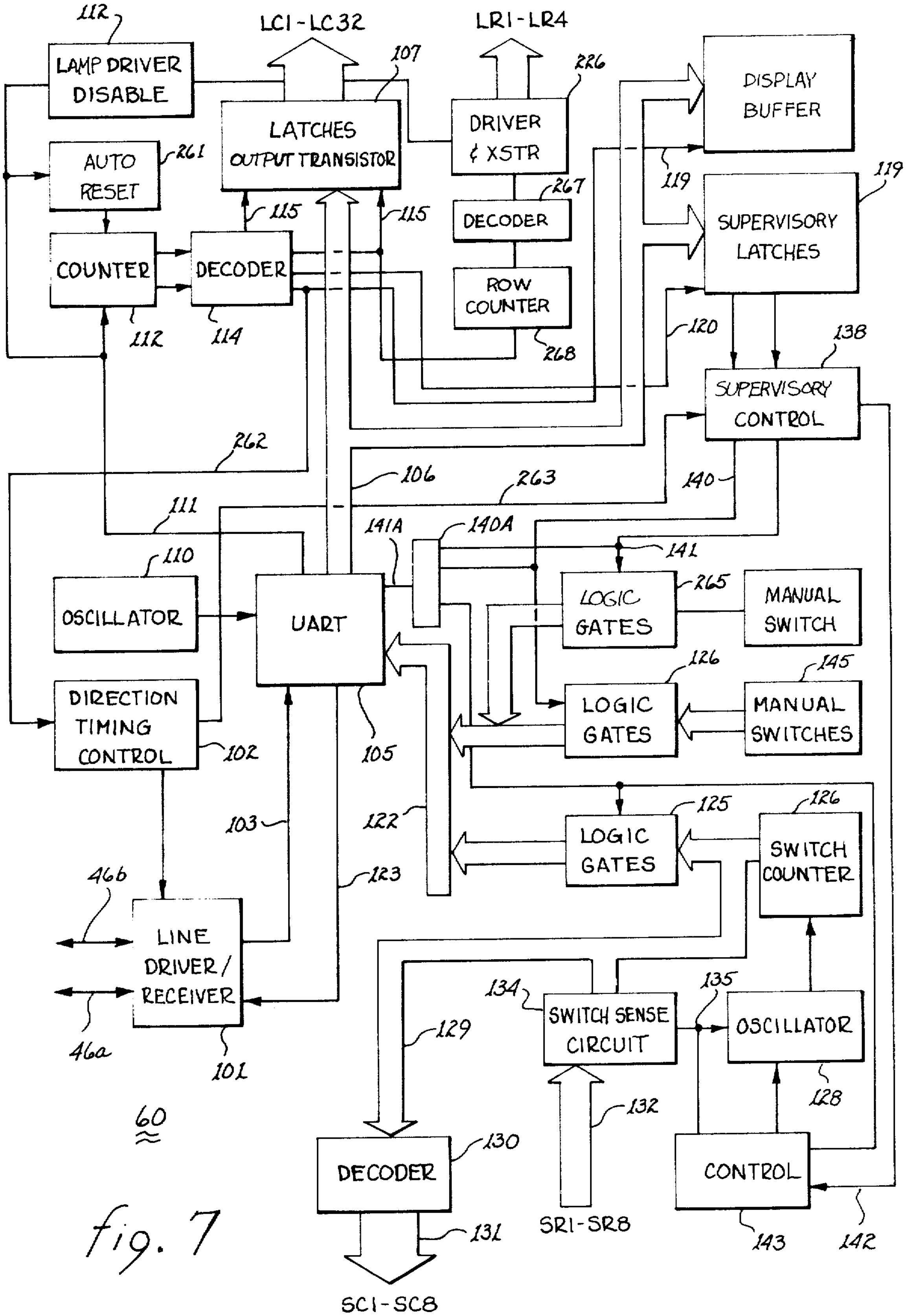

FIG. 7 is a detailed block diagram of the formatting and control block of FIG. 3.

Figure 8:
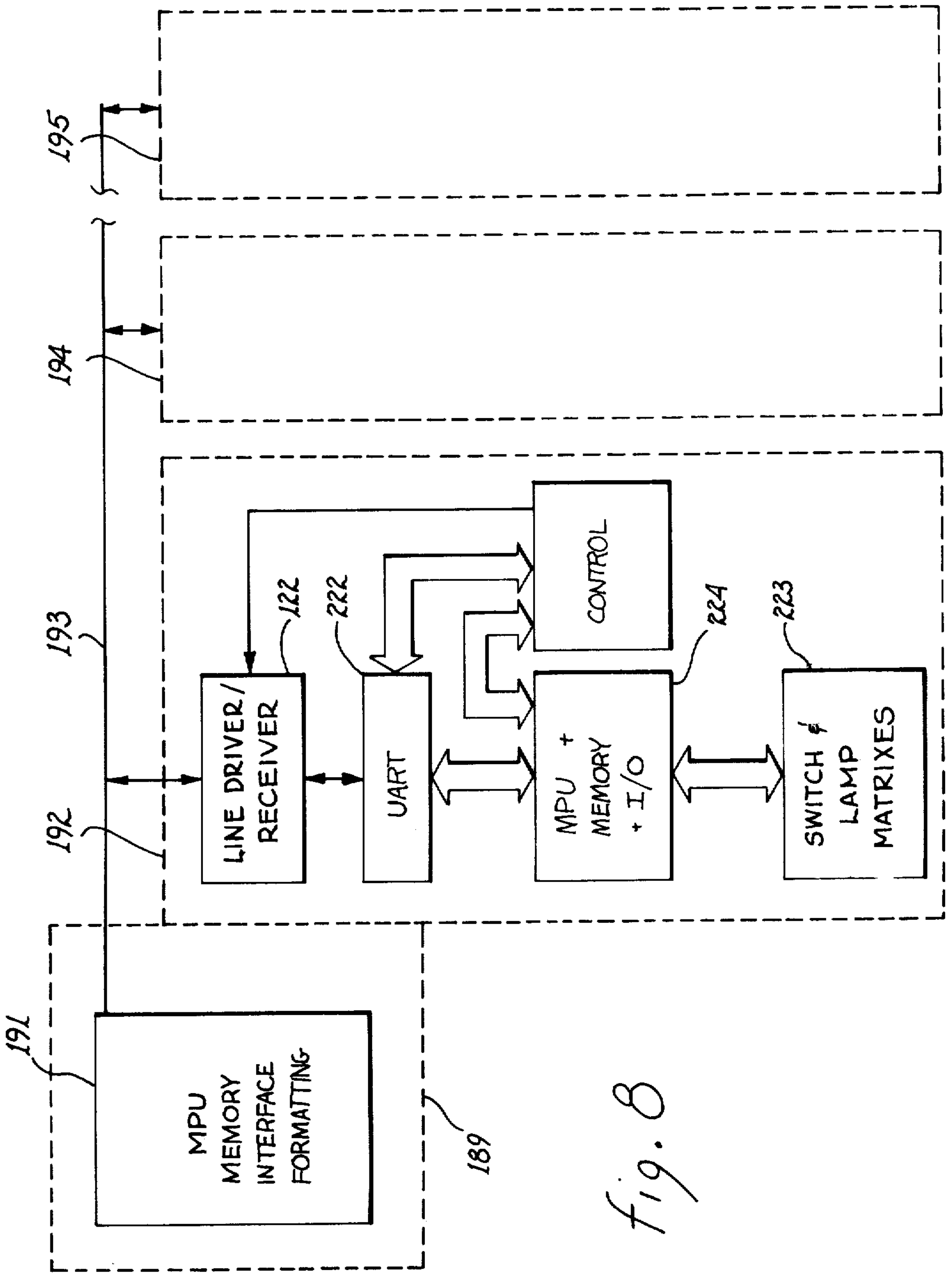

FIG. 8 is a block diagram of a system utilizing a single serial data bus connected to each of the peripheral stations.

FIG. *9a* is a flow chart of a program executed by the processor of FIG. 3.

FIG. *9b* is a more detailed flow chart of one block of the flow chart of *9a*.

FIG. *9c* is a more detailed representation of another block of FIG. *9a*.

DESCRIPTION OF THE INVENTION

Figure 2:
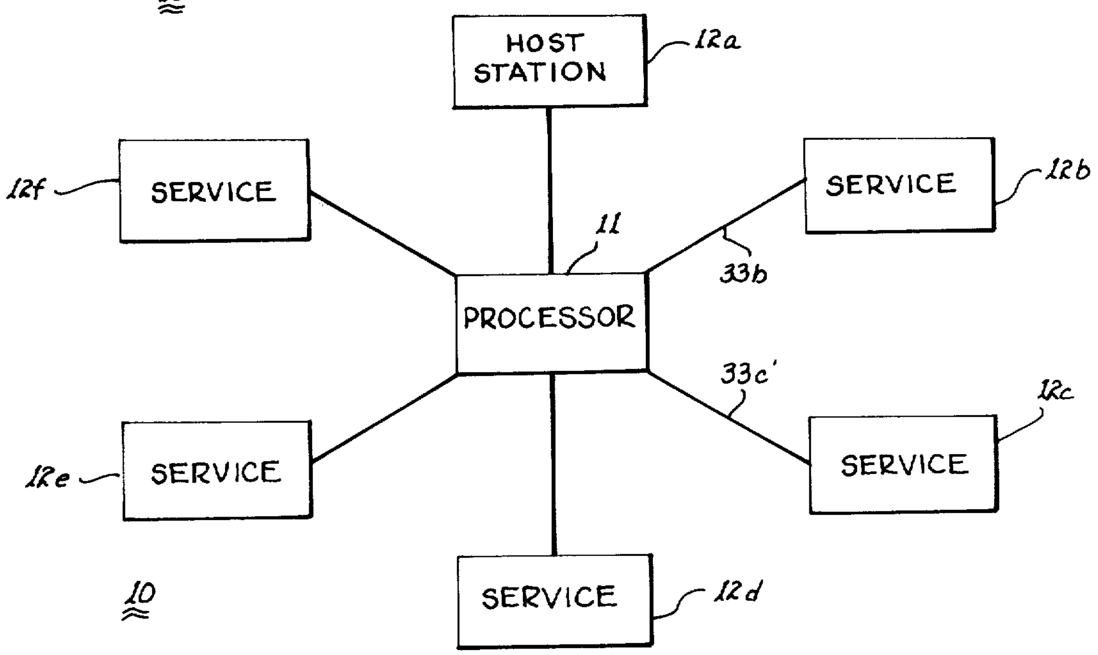
FIG. 2 is a block diagram which shows a processor, a host unit, and a plurality of service units.

Referring to the drawings, particularly to FIGS. 1 and 2, host unit *12a* and service unit *12b* of the table management system 10 are shown. The table buttons such as those indicated by reference numerals *20a*, *21a*, and 22i a, are depressable buttons which activate electrical switches. Each of the table buttons includes a lamp housed therein. Each of the table buttons represents one table in the restaurant. The layout of the buttons on host station *11a* preferably represents an approximate scale model of the layout of tables in the restaurant, so that the location of each of the table buttons such as *20a*, *21a*, etc., approximately indicates the physical location of a table corresponding to that table button somewhere in the restaurant. The buttons shown in FIG. 1 in areas 13, 14 and 15 of host unit *12a* and buttons *30b* and *32b* of service unit *12b*, are control switches which perform functions described hereinafter.

In FIG. 1, tables such as those represented by table buttons *21a* and *21b* are located in booths, while tables such as those represented by table buttons 22a and 23a are surrounded by chairs.

Regions 13 and 14 of host station 12a are regions which represent service locations of the restaurant within which busing trays, utensils, dishes, and other accessories necessary to operation of the restaurant are stored. The service unit consoles are each located in such a service area. The location of the service station console in the service area represented by reference numeral 13 is indicated by control button 30a.

Host unit console 12a includes a control and display section 15, which includes a number of control buttons, as indicated, and also includes a digital readout module 24.

Service unit console 12b has an appearance similar to that of host unit 14, except that control buttons corresponding to those in region 15 have been omitted. The location of the table buttons of service unit console 12b, however, is the same as the locations for corresponding table buttons for host station 12a. The corresponding buttons of the host unit console and the service unit console are designated by the letters "a" and "b", respectively.

Typically, a restaurant monitoring system includes one host unit and a larger number of service units which each monitor a separate section of the restaurant. Host station 12a shown in FIG. 1 monitors the status of 30 tables, which are located in two service areas. The section to the right of dotted line 17 of host unit 12a corresponds to the first service area, and the portion to the left of dotted line 17 corresponds to the second service area. Service unit 12b monitors the first service area. For a larger restaurant, much larger host stations and a larger number of service stations may be employed.

The diagram of FIG. 2 illustrates how the concept of the invention may be utilized to provide a single host station 12a, which monitors the status of the tables in five service areas. The five service areas are also monitored by corresponding service units 12b, 12c, 12d, 12e, and 12f.

It is convenient to next describe the manner in which the above described host stations and service stations are employed by the restaurant personnel, including the hostess, the waiters and the busboys to reduce the time that tables are unoccupied. Assume that initially all of the tables in the restaurant are unoccupied. Assume also that the lamps of all of the table buttons on host unit 12a and service unit 12b and another service unit (not shown), are unlit. A lunch/dinner control button is activated to indicate whether the present time is in a lunch period or a dinner period. This indicates that the tables are unoccupied. Next, assume that a first party of customers arrives at the restaurant. The hostess depresses a table button of the host unit corresponding to the table at which she intends to seat the first party. The table button lights up; the corresponding table button of service station located in the service area of the first table also lights up. Both the service unit and the host unit indicate that the table is now occupied.

As will be explained subsequently, a processor unit such as processor unit 11 of FIG. 2 coupled to the host unit begins to count the number of minutes that the table is occupied; the processor stores this information in its memory.

Next, assume that a second party arrives. As the hostess seats the second party, she depresses a second table button, say, table button number 23 of the host unit 12a, this causes table button 23a of host unit 12a to light up and also causes table button number 23b of service unit 12b to light up. Again, the processor unit counts and stores the number of minutes of occupancy of the second party. Next, assume that additional parties arrive and are seated at various tables, and that corresponding table buttons are depressed as above until all tables in the restaurant are occupied. At this point, all of the table buttons of host unit 12a and service unit 12b and another service unit (not shown) are lighted.

Next, assume that the party at the table corresponding to table button 21a of host unit 12a and table button 21b of service unit 12b finishes dining and departs. The busboy assigned to the service area in which the corresponding table is located notices that the party is leaving, walks over to the service unit 12b and depresses table button 21b thereof. This causes table buttons 21a of host unit 12a and table button 21b of the service unit 12b to blink at a medium rate to indicate that the corresponding table will soon be ready for a new occupancy. The blinking is accompanied by a repetitive audible beeping sound at the host station to alert the hostess. The hostess then checks through her waiting list and summons the next party. Meanwhile, the busboy clears and resets that table. As soon as he completes that task, he walks over to the service station 12b and depresses table button 21b again. This causes host station 12a to beep for a longer time, and also causes table button 21b of service unit 12b and table button 21a of host unit 12a to flash at a faster rate for a predetermined number of flashes. The hostess hears the beeping and glances down to see which table button is flashing; as soon as she determines that it is table button 21a, she seats the next party, whom she previously summoned. She then depresses table button 21b of host unit 12a, causing it and table button 21b of service unit 12b to light up again to indicate that the corresponding table is again occupied. This also causes the processor unit to begin counting the number of minutes that the table is occupied.

Thus, the table corresponding to table buttons 21a and 21b has been unoccupied only for the amount of time required to provide busing service to it and to have the next party walk from the hostess station to the newly set table. As more of the original customers depart, the above procedure is repeated, each time minimizing the amount of time that the tables are unoccupied. The waiting time for customers who have not yet dined is thereby minimized, and the number of "table turns" for each table in the restaurant is thereby increased. Profitability of the restaurant is consequently improved.

In addition to indicating the status of each table, the table management system of the invention provides several other types of status information useful to restaurant personnel. When a diner or party of diners occupies a particular table for a time exceeding a predetermined average occupancy time, the corresponding table button of the service station for the service area blinks at a predetermined rate; however, the corresponding table button of the host station remains unaffected. However, waiters or waitresses serving other tables in the service area will notice the flashing table button, and will recognize that special attention should be paid to the party at that particular table. The flashing light could indicate, for example, either that the service has been too slow, or that the party has not yet received their check.

If a customer at a particular table is dissatisfied for some reason, the waitress may call the hostess on an intercom and explain the problem to her. The hostess then presses manager call button 32a of host unit 12a. This causes manager call buttons 32a of host unit 12a and 32b of all service units to turn on, so that if the manager is walking around the restaurant, he will notice the lighted manager call button at one of the units. He then calls the hostess on the intercom and she tells him at which table the problem exists. The manager then depresses the manager call button at the closest service unit. This causes all of the manager call buttons to turn off. The manager then resolves the problem at the table identified to him over the intercom by the hostess.

The hostess may, by depressing special setup button 30a of host unit 12a, cause special setup button 30b of service unit 12b to light up. This signals the busboy to call the hostess on the intercom; the hostess then gives special setup instructions to the busboy. The busboy then performs the special instructions and presses special setup button 30b of service unit 12b. This causes special setup buttons 30b and 30a to turn off, indicating to the hostess that the special setup is complete. She then seats the appropriate party at the table having the special setup.

During all of the above operations, digital display module 24 of host unit 12a indicates the time of day.

Table management system 10 also is capable of operating in an "executive mode". The executive mode is activated by means of a key lock on the host station 12a. When a key is inserted and turned, the executive mode is established and maintained even after the key is removed. Only the host station goes into the executive mode when the key is turned. The service stations all continue to indicate the various table statuses, such as table occupancy, "being bused" status, overtime status, and manager call status.

As previously mentioned, the processor which controls operation of electronics of the table management system keeps track of the elapsed time during each table occupancy. The processor also counts the number of "table turns" for each table monitored by the system. More precisely, the processor keeps track of the number of table turns during each "lunch period" of each day and the number of table turns during each "dinner period" of each day. By depressing the appropriate sequence of of buttons in control section 15 of FIG. 1 and by depressing a particular one of the table buttons of the host station, the number of table turns for that table during the lunch or dinner period of that day is displayed on display module 24. Further, running totals of table turns for each table are stored in the processor unit and may be similarly displayed. Readout is available after each meal, at the end of each day, week, or month.

By pressing a different one of the control buttons, the host unit goes into a "diner timer" mode, wherein predetermined "average" dinner times and lunch times can be entered into the processor memory. The table overtime signal (i.e., the blinking of the corresponding table button of the proper service unit) for the lunch period and dinner period for the respective tables is then automatically activated whenever the occupancy for the respective table exceeds the preset times.

In tallying the counts of lunch and dinner table turns, the host unit leaves a "trail" to indicate which tables have already been tallied. (The table button which is being tallied blinks, and the ones that have already been tallied remain "on").

In order to switch out of the executive mode and back into the "real time" mode, the operator depresses a "clear" button of the host unit.

Referring to FIG. 3, table management system 10 includes host unit 12a and a plurality of service units, including 12a and 12x. Table management system also includes a processor unit which includes a CPU, memory and interface block 41, an I/O (input/output) formatting block 45, a power supply system 42, and a battery backup system 43. Bus 44 includes a plurality of lines between interface circuits of block 41 to I/O formatting block 45.

The power supply system provides five volts to the electronic circuits of block 41 and the I/O formatting block 45. The power supply system also supplies 28 volts on conductor 56 to the host unit 12a and service units 12b and 12x. Host unit 12a includes the above-mentioned table buttons, control buttons and associated lamps; the switches and lamps are designated by reference numeral 58.

Host unit 12a also includes siwtch and lamp matrix block 55. All of the switches and lamps of the host unit 12a are connected to switch and lamp matrix block 55. Display board 57 includes a digital readout module connected to switch and lamp matrix block 55. Data bus 46, which is a bi-directional serial data bus, is coupled between I/O formatting block 45 of processor unit 11 and formatting and control block 60. Serial data is transmitted between host unit 12a and processor unit 11 on bus 46. Information is bi-directionally transmitted between switch and lamp matrix block 55 and formatting and control block 60 on bus 59. Formatting and control block 60 receives serial data on serial data bus 46 and converts it into a parallel format for application to the lamps of switch and lamp matrix block 55. Formatting and control block 60 also receives parallel formatted data from switches of switch and lamp matrix block 55 and converts it to serial format for transmission to processor unit 11 on serial data bus 46. I/O formatting circuit 45 provides the necessary serial-to-parallel conversion and parallel-to-serial conversion to effect communication between the serial data bus 46 and parallel data bus 44 of block 41.

Service units 12b and 12x are quite similar to host unit 12a; normally, no readout display board is provided on the service units. For example, switch and lamp matrix block 55' and the formatting and control block 60' of service unit 12b, are very similar to corresponding elements of host unit 12a. A separate bi-directional serial data bus such as 47 or 48 is coupled between I/O formatting block 45 of processor unit 11 and each service unit.

In the random access memory of processor board 41, there is for each table a corresponding memory address or location for storing information representative of the status of that table. The status information is stored in the form of binary codes. The state of the service unit with respect to a particular table is stored in the corresponding memory location in the form of a four bit code. The other four bits of that memory location store a code representative of the state of the host unit with respect to that table.

The four bit codes represent whether a table button corresponding to that memory location is in the off mode, the on mode, the being bused mode, the overtime mode, and the "done busing" mode.

Processor unit 11 receives information representative of every switch closure and uses this information to update the table status bytes stored in its memory. Processor unit 11 utilizes the updated status bytes stored in its memory to determine which lamps to light, both in the host station and in the service stations. Processor unit 11 also determines the rates of flashing, the rate of beeping of the host station, computes time of day for the time of day display, stores information representative of the predetermined "average" times for lunch and dinner occupancies, and detects table overtime conditions. Processor 11 also determines the number of times a table button flashes at the higher rate to indicate the "done busing" status of a table; processor 11 also determines the corresponding number of beeps of the host unit. Processor 11 also times and stores the occupancy times of each table and computes and stores the number of table turns for each table.

Processor unit 11 periodically accesses its memory and converts information in eight table status bytes to one eight bit byte, each bit of which represents the turning on or off of one of eight lamps corresponding to the eight status bytes accessed.

Processor unit 11 also executes the routine of FIGS. *9a*–*9c* to convert input information received from the host unit and service units into the updated status information of the table status bytes stored in memory.

Figure 4:
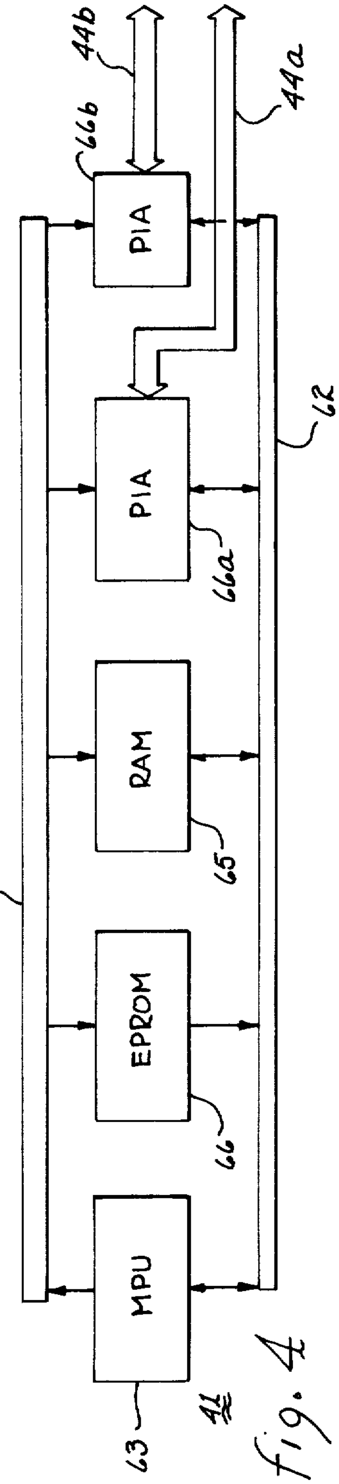
FIG. 4 is a block diagram of the CPU, memory and interface block of the system of FIG. 3.

Referring now to FIG. 4, processor block 41 includes an address bus 61, which includes sixteen conductors, and an eight bit data bus 62. A microprocessor 63, a read only memory 64, a random access memory 65, and two peripheral interface adaptors **66*a* and 66*b* are coupled between address bus 61 and data bus 62**.

Microprocessor 63 may be a Motorola MC6800. Its address bits are connected to the respective conductors or address bus 61, and its bi-directional data bus conductors are connected to data bus 62. Read only memory 64 is an electrically programmable read only memory such as the Intel 2758 or 2716. Read only memory 64 stores the operating program for the processor unit 40. Read only memory 64 is organized as 16,384 words by eight bits.

Random access memory (RAM) 65 includes Intel 2114 static RAMs; random access memory 65 is organized as 4,096 words by eight bits. Each word (i.e., byte) location stores the above-mentioned table status codes representative of the status of a table with respect to the host unit and a service unit. One hundred twenty eight bytes of random access memory 65 are reserved for this purpose, so that the system as shown in the drawing can monitor 128 tables. Of course, the system could be expanded or reduced to accommodate any reasonable number of tables.

The Peripheral Interface Adaptors (PIAs) **66*a* and 66*b* may be implemented utilizing Motorola MC6820's. The MC6820 PIA is a programmable interface adaptor which can be utilized to interface between a microprocessor data bus 62 and other electronic circuitry, in this case, I/O formatting block 45. Peripheral data bus 44 includes 40 lines, 20 for each of the two PIAs. Read only memory 64, and random access memory 65, and peripheral interface adaptors 66*a* and 66*b* are all connected to address bus 61 and are all addressable by the microprocessor 63**.

Since microprocessor 63 does not have the capability of providing large output currents, driver circuits such as the Texas Instruments' 74 LS244 can be coupled between address bus 61 and the address outputs of microprocessor 63 to increase the output current to drive the conductors of address bus 61. Similarly, bi-directional data buffers such as the Texas Instruments 74 LS245 may be coupled between the data bus 62 and the microprocessor 63, in order to increase output current to drive data bus 62.

Figure 5:
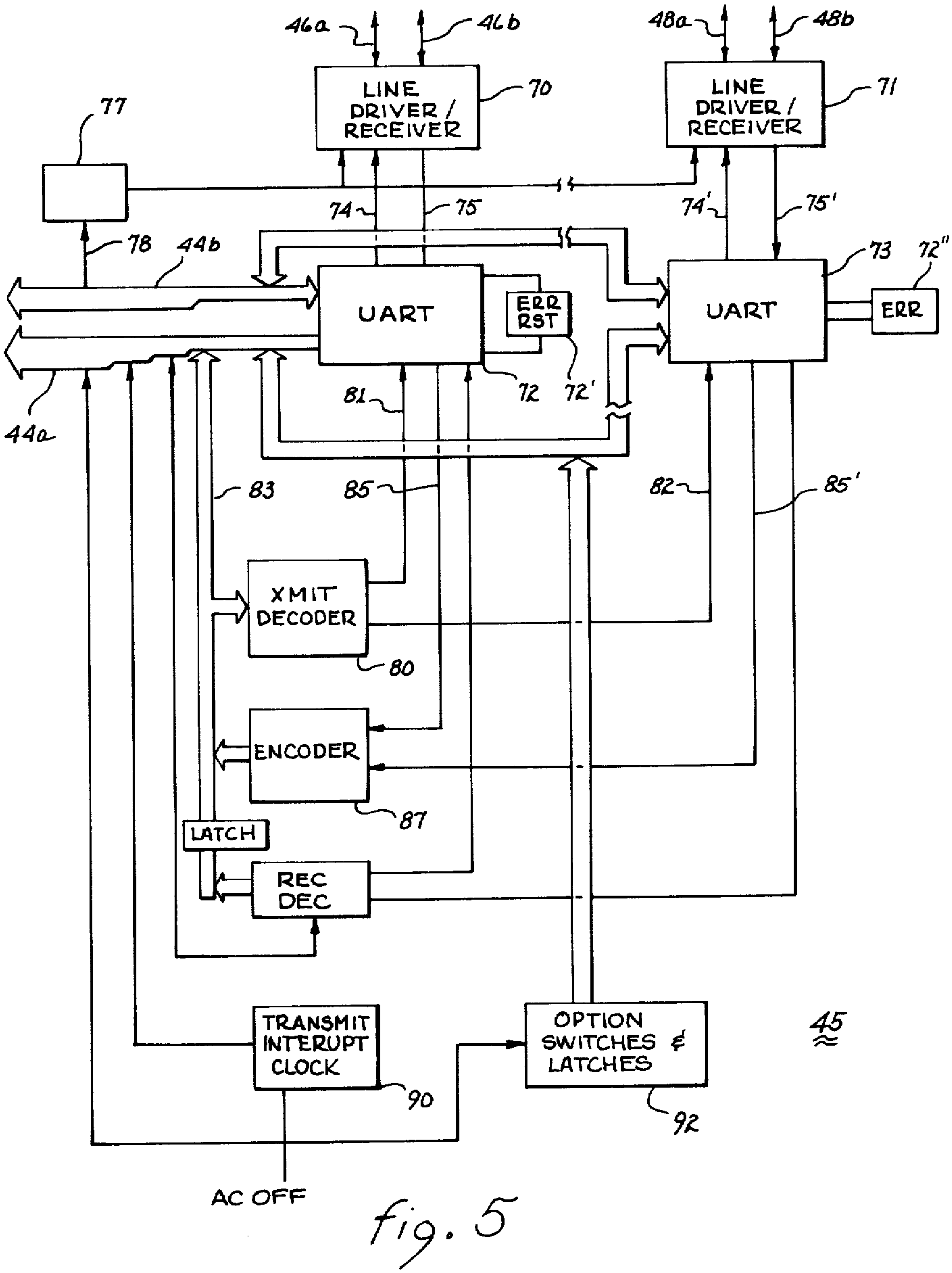
FIG. 5 is a detailed block diagram of the IO formatting block of the system of FIG. 3.

Referring now to FIG. 5, I/O block 45 includes a plurality of line driver/receivers, such as 70 and 71, one for each service unit and host unit connected to processor unit 11. Each of the line driver/receivers is coupled to one of the serial bi-directional data buses; for example, line driver/receiver 70 is connected to bi-directional serial data bus 46, which includes two conductors **46*a* and 46*b*. Similarly, line driver/receiver 71 is connected to two serial data bus conductors 48*a* and 48*b***. (Each of the serial bi-directional data buses includes a pair of information carrying conductors and a shield conductor. Logical complements of the data are conducted on the two data conductors of each data bus. Thus, any common mode noise induced on the conductors will be cancelled out, thereby improving reliability of the system).

I/O block 45 also includes a plurality of UARTs (Universal Asynchronous Receiver/Transmitters), including 72 and 73. Each of the UARTs has eight "transmit" inputs connected to eight conductors of bus **44*b*, which bus is connected to peripheral interface adaptor 66*b* for receiving data in parallel format from PIA 66*b* to be transmitted in serial format to line driver/receiver 70. Each of the UARTS also have eight "receive" outputs connected to eight respective conductors of buss 44*a* for transmitting a byte of data in parallel format to peripheral interface adaptor 66*a* of FIG. 4**.

Each UART of I/O block 45 converts a byte of information received in parallel format from peripheral interface adaptor **66*b* into a byte of data in serial format and transmits it to one of the line driver/receivers connected to that UART. For example, UART 72 transmits data in serial format to line driver/receiver 70 by means of conductor 74. Line driver/receiver 70, when in its "transmit" mode, transmits the data in serial format to formatting and control block 60 of host unit 12*a***.

Line driver/receiver 70, while operating in its "receive" mode, receives serial data from data conductors **46*a* and 46*b* and transmits that data to UART 72 by means of conductor 75. UART 72, upon accumulating a byte of data, transmits that byte of data in parallel format to peripheral interface adaptor 66*a* via eight conductors of bus 44*a*. UART 73 performs a similar function with respect to line driver/receiver 71. (Circuit 77 receives and stores information from processor unit 11 via conductor 78 of bus 44*b*; this information determines whether the line driver/receivers 70 and 71** are in the "receive" mode or the "transmit" mode).

In order to transmit display data representative of status of a particular group of eight tables to one of the service units, processor unit 11 inputs the display data into peripheral interface adaptor **66*b* via data bus 62 and addresses particular registers of peripheral interface adaptor 66*b* by means of address bus 61. The peripheral interface adaptor then transfers data from the microprocessor data bus 62 onto bus 44*b***.

Certain conductors of bus **44*a* are connected as inputs to decoder 80, which decodes such certain conductors to select the one of the UARTs corresponding to the service unit to be transmitted to. Decoder 80 then generates an enable or strobe pulse on one of the conductors 81, 82 (or one of the like conductors not shown), to strobe the parallel formatted information from PIA 66*b* into the UART connected to that conductor. The strobed UART converts the parallel formatted data into serial form and transmits it over one of the serial data buses to the selected hostess unit or service unit connected to that serial data bus. The formatting and control block 60** of that unit produces signals which light or flash the appropriate table lamp.

Processor unit 11, in executing its operating program, sequences through all eight UARTs in the above manner, sends display information representative of updated table status information stored in the memory of processor 11 to the host unit and each of the service units.

If data in serial format is received from one of the serial data buses such as 46, 48, etc., when the line driver/receiver connected to that serial data bus is enabled (by means of circuitry 77), that data is inputted by means of one of the conductors such as 75, or 75', into the appropriate UART. Such data is accumulated and reformatted into a parallel eight bit byte. At this point, that UART sends out a signal via a conductor such as 85 or 85', which signal is inputted to encoder 87. Encoder 87 generates an address on bus 83. The resulting output of encoder 87 is transmitted via bus **44*a* into one of the peripheral interface adaptors, which produces a signal to microprocessor 63. The resulting output of encoder 87 also is inputted to decoder 80, which decodes the address produced by encoder 87 and generates a strobe signal on an appropriate conductor, such as 81 or 82, which strobes the reformatted data received from the line driver/receiver out in parallel format onto bus 44*a*, where it is inputted to peripheral interface adaptor 66*a***.

Microprocessor 63, in the course of executing its stored program, reads both the reformatted data and the station number output from encoder 87 via PIA **66*a*. With that information, microprocessor 63** executes a routine which updates the appropriate table status bytes stored in the random access memory.

The data on bus **44*a* represents particular switch closures, and also represents table status memory locations in the random access memory 65 of FIG. 4**.

The timing of the transmit sequence is established by transmit interrupt clock circuit 90, which is essentially a free-running oscillator which oscillates at approximately 330 cycles per second. It generates the interrupt signals which cause microprocessor 63 to execute a transmit routine which causes display data for one fourth of the lamps to be transmitted to the host unit and each of the service units. Also, a supervisory or control byte and two bytes to drive the display module are transmitted.

Option switch circuitry 92 includes manually settable switches which can be utilized to cause transmitting information via bus **44*a* to processor unit 11 (during the power up operation) to establish desired conditions in microprocessor 63 and in designated memory locations, and in the PIAs. For example, the "convention" adopted to indicate whether tables are occupied or not when a table button is lit, may be established by means of option switch circuitry 92**.

The various blocks and interconnections thereof shown in FIG. 5 may be readily provided by those skilled in the art. For example, the line driver/receivers may be Texas Instruments' SN 75118's. The UARTs may be implemented utilizing IM 6402's manufactured by Intersil, Inc. Enable circuitry 77 may be implemented by commonly available flip-flops. Decoder 80 may be implemented by a Texas Instruments' 74 LS138. Encoder 87 may be a Motorola MC 14532. The option switches and tri-state drivers 92 may be readily implemented by means of switches in a DIP package and by means of a Texas Instrument' 74 LS244.

Referring now to FIGS. **6*a* and 6*b*, a push button switch 203 which produces a switch closure when depressed and which has an independent lamp 204 which can illuminate the push button is shown in detail in FIG. 6*a*. There are 128 such switches and associated lamps available to be used as table switches in one embodiment of the invention, corresponding to 128 tables. The electrical contacts of the switch operate to provide a short circuit between the "SR" and "SC" conductors connected to the switch contacts 207 and 205, respectively. When the appropriate voltages are applied between the "LR" and "LC" terminals connected to lamp 204, lamp 204** will be illuminated.

Referring now to FIG. **6*b*, switch and lamp matrix block 55 includes switch matrix 104, which includes eight "SR" conductors designated SR1–SR8, and sixteen "SC" conductors designated SC1–SC16. Switch and lamp matrix block 55 also includes lamp matrix 105, which includes four "LR" conductors designated LR1–LR4, and thirty-two "LC" conductors designated LC1–LC32. Switch matrix 104 in FIG. 6*b* illustrates a matrix of 128 switches, wherein each dot represents one switch such as switch 203 of FIG. 6*a*. Similarly, each of the dots in the lamp matrix 105 represents a lamp such as lamp 203 of FIG. 6*b***.

The conductors SR1–SR8, SC1–SC16, LR1–LR4, and LC1–LC32 are all connected to formatting and control block 60, and are included within bus 59 of FIG. 3.

The switch matrix scanning operation is such that the circuitry of formatting and control block 60 sequentially provides voltages to the sixteen "SC" lines while sensing the voltage on one of the eight "SR" lines to detect whether there has been a closure on any of the switches connected to that SR line. Thus, the location of any switch closures is determined after the above procedure has been repeated for each of the eight SR lines.

Processor unit 11 transmits "bursts" of information, each of which includes seven "transmissions". Four of the seven transmissions contain lamp data; two of the other three contain information for display module 24 of FIG. 1, and one contains "supervisory data" explained subsequently.

Each of four sequential bursts of transmissions carry lamp data for one fourth of the lamps. (The lamps which are "on" are pulsed one fourth of the time, i.e., they have a twenty-five percent duty cycle.) For the first burst, the information from the processor unit 11 causes formatting and control block 60 to apply an "on" signal to LR1 of lamp matrix 105, and then applies strobe signals to LC1–LC32 as required to light the appropriate lamps. LR2, LR3 and LR4 are similarly activated on the three subsequent bursts. This system operates at such a rate that the lamps which are "on" get turned on approximately eighty times a second.

Referring next to FIG. 7, formatting and control unit 60 performs the functions of scanning switch matrix 104 switches and sensing the resulting signals from switch matrix 104 to detect any switch closures, and transmitting switch identifying information which identifies the particular switches (and table buttons) which produced the switch closures. Formatting and control circuit 60 also receive display information in serial format from processor unit 11, convert the display information to parallel format, and generate signals to activate the appropriate lamp matrix conductor arrays to control the lighting and flashing of the lamps associated with the table buttons to indicate the status of the corresponding tables.

Formatting and control circuit 60 includes line driver/receiver 101, which is connected to bi-directional serial data bus conductors 46*a* and 46*b*. Direction control monostable flip-flop 102 stores a logic state which determines whether line driver/receiver 101 is in the transmit or receive mode. Line driver/receiver 101 has an output connected by means of conductor 103 to UART 105 to transmit serial data received from bus 46*a*, 46*b* to UART 105, which accumulates serial data from line driver/receiver 101 and reformats it into a parallel byte which is transmitted by means of bus 106 to output latch circuitry 107.

Automatic reset circuit 261 detects the end of a "burst" of transmission by processor unit 11, and sets counter 112 back to zero in response to such detecting. This indirectly sets direction control monostable 102 into the "transmit" state by means of conductor 262.

UART 105 is clocked by means of oscillator 110. UART 105 produces an advance signal on conductor 111 which activates counter 112 when UART 105 has accumulated a byte of serial information and is ready to transmit it in the form of a parallel byte of information on bus 106. Decoder 114 decodes the outputs of counter 112, thereby generating an enable signal on conductor 115, which enable signal is inputted to enable eight of the latches of latch circuitry 107 to receive the byte of display data on bus 106.

When formatting and control circuit 60 is in the "receive" mode, supervisory control circuit 138 is conditioned by conductor 263 from direction control monostable 102 to disable UART 105 from transmitting serial data.

Latch circuitry 107 also includes output transistors to drive lines LC1–LC32, which are connected to the corresponding conductors of the light matrix 105 of FIG. 6, thereby causing certain of the lamps, determined by the byte of display data enabled into the first eight latches, to be turned "on". As soon as a second serial byte of information from the processor unit is received on bus 46*a*, 46*b* by line driver/receiver 101 and is transmitted to and accumulated by UART 105, a second advance signal is sent out on conductor 111 to advance counter 112 to its next state. The next state is decoded by decoder 114, which produces a signal on conductor 117 to enable the second group of eight latches to receive the second byte of display data available on bus 106 from UART 105.

LR latches and output transistor circuit 266, decoder 267, and row counter 268 cooperate to sequentially drive conductors LR1–LR4 each time a new burst of display information is loaded into latch and output transistor circuit 107.

The first four one-byte serial transmissions from the processor cause four groups of eight output latches to receive the data. The fifth byte is loaded into supervisory latch 119, which is enabled by a signal produced on conductor 120 by decoder 114. The information in the byte stored in supervisory latch 119 controls the above-mentioned beeper of the host console, controls some reset functions, controls the blinking "colons" of the time of day clock, and also stores information which causes the switch closure identifying information to be transmitted from the formatting and control circuit 60 to processor unit 11 by means of bus 46*a*, 46*b* as explained subsequently.

As previously mentioned, formatting and control circuit 60 also performs a table button scanning and switch closure sensing function and formats the results into serial bytes of status data which are transmitted to the processor when the line driver/receiver 101 is in the transmit mode.

Bus 122 is connected to the inputs of UART 105, whereby UART 105 receives a parallel byte of information and reformats it into a serial format and transmits it via conductor 123 to line driver/receiver 101. Line driver/receiver 101, when in the transmit mode, transmits the data in serial format to processor unit 11 via bi-directional serial data bus 46*a*, 46*b*. The information on transmit bus 122 is produced from several sources. First, address information representative of the location of each table button producing a switch closure is gated onto transmit bus 122 by logic gates 125 from switch address counter 126. This address information, when converted to serial data which is transmitted to the processor unit I/O block 45, and reconverted to a parallel format and inputted to processor block 41, it is utilized by microprocessor 63 to process the table button closure information in accordance with a stored routine. The information is also utilized to address the random access memory locations corresponding to the table buttons from which the closure information is derived.

The switch identifying information (which is utilized by the stored program to produce the memory address of the table status byte corresponding to the table button which was depressed to produce the subject switch closure) is produced in switch address counter 126 in the following manner. First, oscillator 128 causes switch address counter 126 to count, producing switch identifying information on bus 129, which information is inputted to decoder 130. Decoder 130 generates signals on outputs SC1–SC16 in the sequence described above with respect to switch matrix 104. Each time switch address counter 126 counts through its sequence, consecutive ones of switch matrix conductors SR1–SR8 of bus 132 are sensed by switch sense circuitry 134. Every time a table button closure is detected, switch sense circuitry 134 produces a signal on conductor 135, which stops oscillator 128. This, in turn, stops switch address counter 126. The count in switch address counter 126 then represents the identify of the depressed table button. This address information is gated by means of logic gates 125 into the transmit inputs of UART 105, where it is serialized. The information is then transmitted in a serial format to processor unit 11 which indicates which switches were closed by means of line driver/receiver 101. Processor unit 11 then processes the switch closure information and makes the necessary computations to update the corresponding table status bytes in the memory.

Control circuit 138, in response to information in supervisory latches 119 and information from direction control flip-flop 102, produces enable pulses on conductors 140 and 141 to enable logic gates 125 and 126 and also produces control signals on conductor 142 to control control circuitry 143. Control circuitry 143 performs the function of allowing the switch identity information to be transmitted.

Logic gates 126 permit transmitting of information manually set by means of switches 145 in the FIG. 7. This information may represent the assignment of particular tables in the restaurant to particular table buttons. (This information is checked every 10 seconds by the processor).

Control circuit 143 operates to compensate for switch bounce signals received on SR1–SR8, and also is responsive to the signal generated on conductor 142 by control circuit 138 to prevent the transmission of switch identifying information to UART 105 when line driver/receiver 101 is in the receive mode.

Control circuit 143 generates a twenty microsecond pulse on conductor 150. The twenty microsecond pulse restarts oscillator 128, by resetting a flip-flop (not shown) in control circuit 143. The outputs of supervisory control circuit 138 and the output of control circuit are ANDed by circuitry 140*a* to strobe data from logic gates 265, 125, and 126 into UART 105, thereby causing serial transmission of such data to processor unit 11 via line drive/receiver 101. Counter 126 is thereby restarted and continues scanning the switch matrix until another table button closure is detected; at this point, the above procedure for transmitting the identity of the table button generating the switch closure to the processor unit is repeated.

Figure 9C:
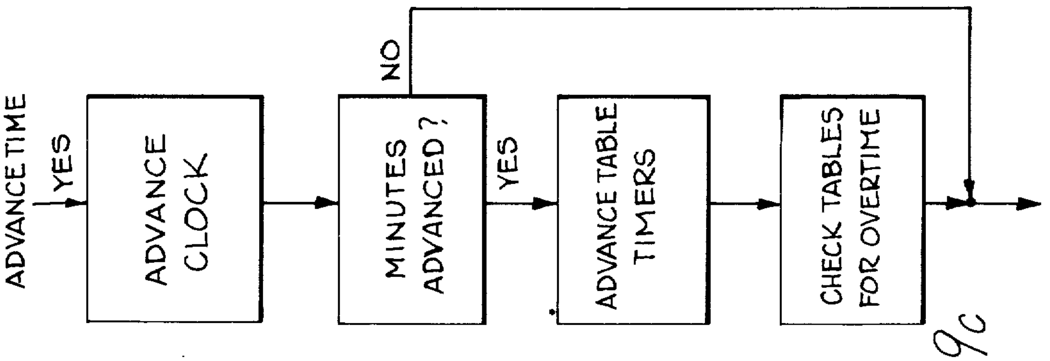
Figure 9B:
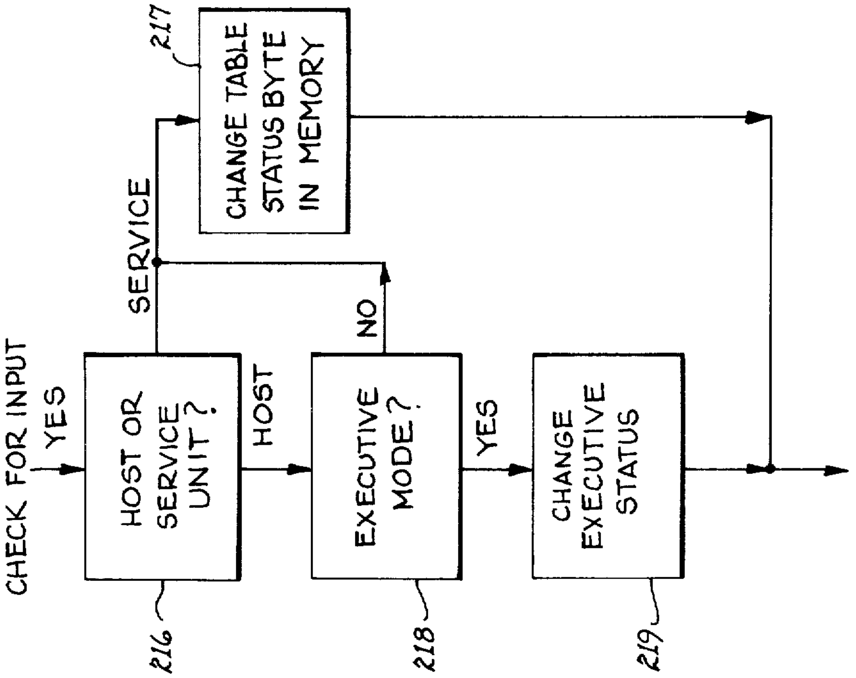
Figure 9A:
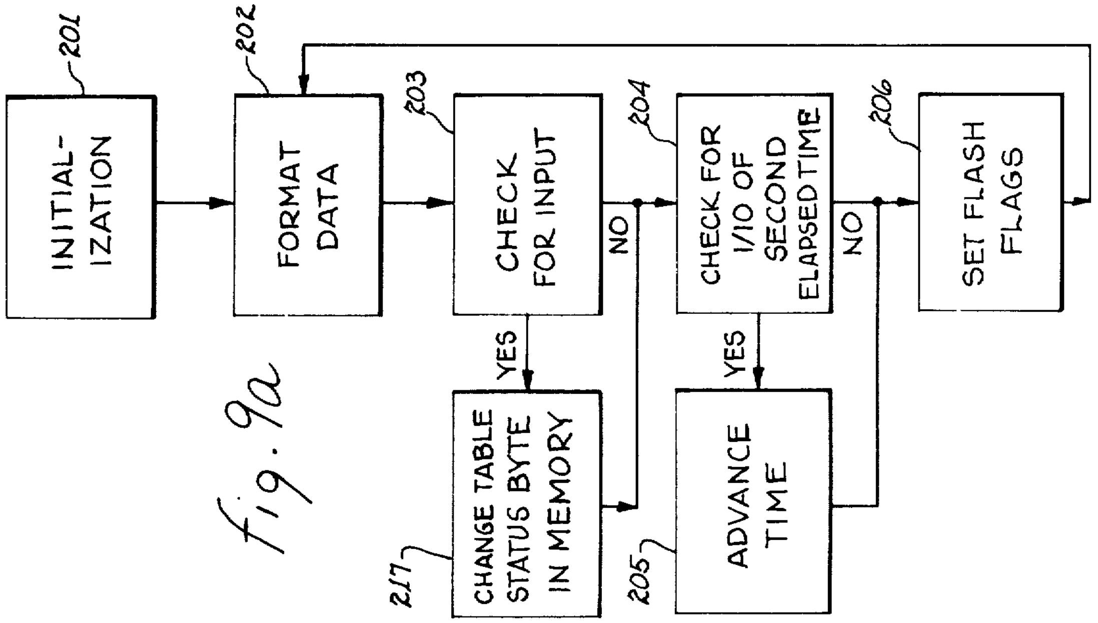

FIGS. 9*a*–9*c* show a basic flow chart of the routine executed by microprocessor 63 in FIG. 1.

Referring to FIG. 9*a*, block 201 of the routine represents a sub-routine which accomplishes initialization of the various memory states in the processor unit. The initializations include clearing of random access memory 65 of FIG. 1, and loading appropriate states into peripheral interface adaptors 55*a* and 66*b* to preset them to provide the proper input and output functions necessary to interface with I/O formatting block 41 of FIG. 3.

Block 202 represents a "format data" sub-routine which causes a table status byte to be fetched from one of the above-mentioned 128 memory locations to be reformatted into individual bits, each of which represents an "on" state or an "off" state for a particular lamp in the system. The reformatted data is then written into each of two separate memory locations from which one byte, representing on or off condition of eight lamps, may be transmitted to a preselected one of the service units or to the host unit, respectively.

Block 203 represents a sub-routine which checks for an input representative of a switch closure from the host unit or one of the service units. FIG. 9*b* illustrates the details of the "check for input" routine in more detail. In an input from one of the service units or the host unit is present, then the "check for input" sub-routine determines whether the input is from a service unit or the host unit, as indicated by block 213 of FIG. 9*b*. If the input is from a service unit, the "check for input" sub-routine accesses the location of memory which corresponds to the table from which the switch closure input was received and updates the table status byte for that table accordingly (as indicated by clock 217) and then moves on to block 204. However, if the switch closure input comes from a host unit, the routine makes a determination whether the host unit is in executive mode as indicated in block 218. If the host unit is not in the executive mode, the "check for input" sub-routine accesses the memory location in which the status byte for the appropriate table is stored and updates that status byte as indicated by block 217. If the host unit is in the executive mode, the "check for input" sub-routine enters the "change executive status" block 219 of FIG. 9*b*. This block selects which of the above-mentioned functions in the executive mode is next to be performed.

Once the table status byte in memory has been updated, the routine enters sub-routine 204, which causes microprocessor 63 to make a determination whether one tenth of a second has elapsed since the last time the table overtime counters and the time counters which count minutes for the time of day display were advanced. If one tenth of a second has elapsed, the routine enters the "advance time" sub-routine indicated by reference numeral 205. Sub-routine 205 performs the function of advancing the table overtime counters and the time of day counters. If one tenth of a second has not elapsed, the routine enters sub-routine 206, which sets the flash flags, which establish the various flashing rates. After the flash flags are set, the routine loops back to the format data sub-routine 202.

The advance time routine 205 is shown in more detail in FIG. 9*c*. The first step in the advanced time sub-routine is to advance the clock. Sub-routine 205 then checks the "minutes" stored in the memory to see if they have been advanced. If they have not been advanced, the sub-routine 205 is exited. If the minutes have been advanced, sub-routine 205 advances the table timer counters and checks all of the tables to determine if an overtime condition exists at any of them, and changes the table status accordingly.

Given the above flow charts, one skilled in the art of programming microprocessors could readily provide the individual steps required to produce an operating sub-routine which would operate on incomming data in the system of FIG. 3 for a particular microprocessor. The transmit routine, not shown, merely accesses the memory and transmits the status information to the various units. One skilled in the art could readily provide such a simple routine.

As previously mentioned with reference to FIG. 1, a display module 24 is provided to display the number of table turns per period, cumulative table turns, and average occupancy time remaining for a given table, upon request by the operator. Such information could be outputted from processor 11 via a printer or other type of display unit, such as a CRT (Cathode Ray Tube) or a plasma display unit. Data could then be displayed or printed out without interrupting the "real time" operation of the system.

The routine of FIG. 9*a* may be modified to permit the hostess to provide additional inputs to the host unit 12*a* as to the number of members of each party prior to seating them. This information can then be stored in memory for each table and read out as desired. This information can also be used to compute averages, which may then be printed out or displayed upon command. The number of members in each party can be inputted to the system by depressing the appropriate table button at the host unit a number of times equal to the number of persons in the party; alternatively, additional buttons can be provided on the host unit to indicate the number of persons in each party.

An additional routine may be stored in the computer memory to compute the likely amount of time before the next table having a specified number of seats will become available. This computation may be made on the basis of known average occupancy time (for a party of a given size) for that table; such average times for each table are entered as inputs into the computer memory and stored there for making the above computations. In response to a request by a party on the waiting list, the waitress may then display the computed likely waiting period for the next two or three tables of the required size. The waiting customers can then be accurately informed of the remaining waiting period.

The system of the present invention is also applicable to other types of "servicing stations" than those in restaurants. For example, the system of the invention may be installed in a large auto repair facility, with the host unit located in the service manager's office and service units located in predetermined service areas each encompassing a number of "repair stalls" or "repair stations". Each so-called "table button" of the host unit and the service units could then represent one of the "repair stalls". The status of each repair stall could be indicated by the lit or unlit or flashing condition of the various "repair stall buttons". Status information could be inputted to the system in substantially the same manner as if the system was installed in a restaurant. The inactive time of each repair stall is thereby reduced because automobiles waiting for repair can be quickly moved in to replace automobiles on which repair tasks have been completed.

Similarly, the present invention may be implemented in hotels, hospitals or other service-oriented organizations to display occupancy status, post-occupancy status, room, station, or service availability. In certain cases, auxiliary "master" units capable of displaying the status of all units of the organization and also capable of accepting various control inputs may be included to provide total overviews of room, station, or service status needed by different organization personnel having varying degrees of analysis and control responsibility.

Referring to FIG. 8, a monitoring system is shown including a central processing unit 191 which includes a microprocessor, a memory, interface circuitry, formatting, and input/output circuitry which is connected to a single serial bi-directional data bus 193. A plurality of remote units 192, 194, and 195, are connected to bi-directional serial data bus 193. The basic details of unit 192, which could be either a host unit or a service unit, are shown. Remote unit 192 includes a line driver/receiver 221 which transmits and receives serial data from serial data bus 193 and transmits it or receives it from UART 222, which performs serial-to-parallel data conversion and the necessary parallel-to-serial data conversion, as previously mentioned. Each host unit and each service unit includes its own microprocessor, memory, formatting circuitry, and input/output circuitry. Circuit 224 includes integrated circuitry which includes a microprocessor, memory and input/output latches. Switch and lamp matrixes 223 are controlled by the input/output circuitry of the circuit 224.

Much of the timing and control circuitry of the system of FIG. 3 is eliminated by the system of FIG. 8. Also, the number of serial data buses is reduced to one common bus (i.e., bus 193). The line driver/receivers and UARTs for the additional bi-directional serial data buses of the system of FIG. 3 are eliminated. Much of the timing and control circuitry associated with the formatting and control board 60 of each of the service units and the host unit of the system of FIG. 3 are eliminated and replaced by software associated with circuitry 224 of FIG. 8. The internal operation of the system of FIG. 8 is different, in important respects, from that of the system of FIG. 3. Every time there is a change in lamp status received by processor unit 199, it will transmit updated table status information for all tables in the system. This updated table status information would be read by all service units and the host unit. The processor transmission would further include a frame to determine which of the service units or host unit would be enabled to transmit back to processor 191 after the present transmission. In this manner, processor unit 191 "addresses" all of the remote units connected to the serial bus 193.

During each transmission by processor unit 191, the microprocessor unit in each remote unit receives all of the lamp data from serial data bus 193 and selects that portion of the lamp data corresponding to lamps for tables monitored by unit. Each respective microprocessor formats the appropriate portion of the received display information data and applies it to appropriate conductors of the lamp matrix.

Each microprocessor associated with the respective peripheral units also controls the scanning of the switch matrixes to detect switch closures, and keeps the information representative of such switch closures available to transmit to processor unit 199 during that peripheral unit's turn to transmit.

Dotted line 189 indicates that processor unit 191 may be installed within the host unit 192. This further simplification is made possible by the above-mentioned reduction in circuitry made possible by the single bus system of FIG. 8.

We claim:

1. A table status system for displaying present status of each of a plurality of tables in a restaurant, each table being capable of having a status of being vacant, being occupied by patrons of the restaurant, or being bussed, the tables being organized in at least first and second groups, said table status system comprising in combination:

a. a host station, said host station including
   - i. first table status indicator means for indicating the present status of each of the plurality of tables, said first table status indicator means including a plurality of visual indicator means, each corresponding to a respective table, for visually indicating the present status of that table,
   - ii. first information entry means for receiving first information from a first operator, said first information indicating that a first table in the first group is occupied or vacant;

b. at least one substation, said substation including
   - i. second table status indicator means for indicating the present status of each of the tables in the first group, said second table status indicator means including a plurality of visual indicator means, each corresponding to a respective table of the first group, for visually indicating the present status of that table,
   - ii. second information entry means for receiving second information from a second operator, said second information indicating that said first table is being bussed;

c. memory means for storing table status information representing the present status of each of the tables, said memory means including a plurality of adressable locations, each of said addressable locations corresponding to a respective one of said tables, each of said addressable locations storing information representing the status of the table corresponding to that addressable location;

d. processor means coupled to said host station, said first information entry means, said substation, and said second information entry means for receiving said first information from said first information entry means, receiving said second information from said second information entry means, writing said first and second information into said memory means, fetching said first and second information from said memory means, and effecting transmitting of said fetched first and second information to said host station and said substation;

e. data bus means coupled to said processor means, said host station and said substation for bidirectionally conducting said first information in serial form between said processor means and said host station and bidirectionally conducting said second information between said processor means and said substation;

f. first formatting means coupled between said data bus means and said first information entry means for converting said first information into a first serial format and then transmitting said first information in said first serial format along said data bus means;

g. second formatting means coupled between said data bus means and said second information entry means for converting said second information into a second serial format and then transmitting said second information in said second serial format along said data bus means;

h. first control means coupled between said first table status indicator means and said data bus means for receiving first information fetched from said memory means, producing a first control signal in response to said first information fetched from said memory means and causing the visual indicator means of said first table status means corresponding to said first table to indicate whether said first table is occupied or vacant; and i. second control means coupled between said second table status indicator means and said data bus means for receiving said first information fetched from said memory means, producing a second control signal in response to said first information fetched from said memory means and causing the visual indicator means of said second table status indicator means corresponding to said first table to indicate whether said first table is occupied or vacant.

2. The table status system of claim 1 wherein each of said plurality of visual indicator means of said first table status indicator means includes a light for indicating whether the table corresponding to said light is occupied or vacant in response to said first control light.

3. The table status system of claim 2 wherein if said second information indicates that said first table is being bussed, then said first control means produces a third control signal in response to said second information fetched from said memory and causes said light to flash at a first rate in response to said third control signal, and wherein if said second information indicates that said bussing of said first table has been completed, then said first control means produces a fourth control signal and causes said light to flash at a second rate in response to said fourth control signal if bussing of said first table has been completed less than a predetermined number of seconds prior to the present time.

4. The table status system of claim 3 further including means in said host station for producing an alert sound in response to said fourth signal.

5. The table status system of claim 1 wherein said data bus means includes a first pair of conductors coupling said host station to said processor means and a second pair of conductors coupling said substation to said processor means.

6. Table status system of claim 1 wherein said data bus means includes a single pair of conductors coupled to both of said host station and said substation for i. conducting said first information in said first serial format from said first formatting means to said processor means, ii. conducting said fetched first information from said processor means to said first control means, iii. conducting said second information in said second serial format from said second formatting means to said processor means, and iv. conducting said fetched first information from said processor means to said second control means.

7. The table status system of claim 2 wherein said processor means includes third formatting means coupled to said data bus means for converting said first information in said first serial format to a first parallel format, said third formatting means also converting said second information in said second serial format to a second parallel format.

8. The table status system of claim 1 wherein said first information entry means includes a plurality of switches each corresponding to a respective one of the tables in the restaurant, each of said switches in said first information entry means being actuatable to effect manual entry of said first information into said first information entry means, said first formatting means including scanning means for sequentially scanning said switches of said first data entry means to detect a closure of said first switch, said scanning means further including means for identifying a one of said switches for which a closure has been detected, producing a code representing the switch closure and identity of the switch for which the closure has been detected, and transmitting the code in a serial format along said data bus means, said processor means utilizing said code to access the location in said memory means corresponding to the switch for which the closure has been detected to write said first information into said memory means.

9. The table status system of claim 2 wherein said processor effects indicating the present status of said first table by accessing the location of said memory means in which said first information is stored and fetches said first information and transmits said first information along said data bus means to said first control means, and said first control means routes said first information to the light corresponding to said first table.

10. The table status system of claim 1 wherein said first information entry means prevents entry of said second information into said host station via said first information entry means.

11. A method of utilizing a processor associated with a host station and a substation for communicating table status information between restaurant personnel in a restaurant having a plurality of tables, said method including the steps of:

(a) manually entering first information representative of the occurrence of a first event at a first table into said host station or said substation;

(b) producing a first code representing the identity of said first table and converting said first information and said first code into a format suitable for serial transmission to said processor, said processor having a memory having a plurality of addressable locations each corresponding to a respective one of the tables;

(c) serially transmitting said first information and said first code to said processor along a serial data bus;

(d) utilizing the processor to operate on said first code to produce second information representative of a first location of said memory corresponding to said first table;

(e) utilizing said second information access said first location and storing said first information in a memory of said processor at said first location of said memory corresponding to said first table;

(f) fetching said first information from said first location of said memory;

(g) transmitting said first information and said first code to said host station;

(h) decoding said first code to effect routing of said first information to a first display element; and (i) displaying information representative of the occurrence of said first event at said host station by means of said first display element in response to said first information.

12. The method of claim 11 wherein said first event includes occupancy of said first table by a first customer.

13. The method of claim 12 further including the step of transmitting said first information to said substation and displaying information representative of the status of said first table at said substation in response to said first information.

14. The method of claim 13 further including the steps of:

(a) storing a predetermined number in the memory of said processor after the steps recited in claim 13;

(b) determining the elapsed time during which the first customer occupies said first table;

(c) comparing said elapsed time with said predetermined number and producing an overtime signal if said elapsed time exceeds said predetermined number;

(d) transmitting said overtime signal to said service station in response to said overtime signal; and (e) displaying information indicative of said overtime condition at said first table at said service station in response to said overtime signal.

15. The method of claim 13 further including the steps of:

(a) manually entering third information representative of the occurrence of a second event at said first table into said substation;

(b) producing said first code and converting said third information and said first code into a format suitable for serial transmission to said processor unit;

(c) serially transmitting said third information and said first code to said processor along the serial data bus;

(d) performing computations on said first code to produce said second information representative of said first location in said memory;

(e) utilizing said second information to access said first location and storing said third information in the memory of said processor at said first location of said memory;

(f) fetching said third information from said first location of said memory;

(g) transmitting said third information and said first code to said host station;

(h) decoding said first code to effect routing of said third information to said first display element; and (i) displaying information at said host station representative of the occurrence of said second event at said first table by means of said first display in response to said third information.

16. The method of claim 15 wherein said second event includes the leaving of said first table by the first party.

17. The method as recited in claim 16 further including the steps of:

(a) manually entering fourth information representative of completion of an operation of busing and resetting of said first table into said service station;

(b) serially transmitting said fourth information and said first code to said processor;

(c) performing computations on said first code to produce said second information representative of the said first location in said memory;

(d) utilizing said second information to access said first location and storing said fourth information in said location of said memory processor;

(e) transmitting said fourth information to said host station; and (f) displaying information at said host station representative of the completion of busing and resetting of said first table.

18. The method of claim 11 wherein said format is a serial format.

* * * * *